(12) United States Patent
Hwang et al.

(10) Patent No.: US 10,662,326 B2
(45) Date of Patent: May 26, 2020

(54) PROCESS FOR PRODUCING A FLAME-RETARDANT POLYESTER

(71) Applicant: Far Eastern New Century Corporation, Taipei (TW)

(72) Inventors: Der-Ren Hwang, Taipei (TW); Cheng-Ting Wang, Taipei (TW); Yen-Hsien Li, Taipei (TW)

(73) Assignee: Far Easter New Century Corporation, Taipei (TW)

( * ) Notice: Subject to any disclaimer, the term of this patent is extended or adjusted under 35 U.S.C. 154(b) by 62 days.

(21) Appl. No.: 15/904,065

(22) Filed: Feb. 23, 2018

(65) Prior Publication Data
US 2019/0106567 A1    Apr. 11, 2019

(30) Foreign Application Priority Data
Oct. 11, 2017 (TW) .............................. 106134723 A

(51) Int. Cl.
| | | |
|---|---|---|
| *C08L 67/03* | (2006.01) | |
| *C08G 63/183* | (2006.01) | |
| *C08G 63/82* | (2006.01) | |
| *C08G 63/80* | (2006.01) | |
| *C08G 63/692* | (2006.01) | |
| *C08G 63/85* | (2006.01) | |

(52) U.S. Cl.
CPC ............ *C08L 67/03* (2013.01); *C08G 63/183* (2013.01); *C08G 63/6926* (2013.01); *C08G 63/80* (2013.01); *C08G 63/82* (2013.01); *C08G 63/85* (2013.01); *C08L 2201/02* (2013.01)

(58) Field of Classification Search
CPC .. C08G 63/183; C08G 63/6926; C08G 63/80; C08G 63/82; C08G 63/85; C08L 2201/02; C08L 67/03
See application file for complete search history.

(56) References Cited

U.S. PATENT DOCUMENTS 5,399,428 A    3/1995   Asrar

FOREIGN PATENT DOCUMENTS

| CN | 1563141 A | 1/2005 |
|---|---|---|
| CN | 102020766 A | 4/2011 |

OTHER PUBLICATIONS

Li et al., "Phosphorus-Containing Poly(ethylene terephthalate): Solid-State Polymerization and Its Sequential Distribution", Ind. Eng. Chem. Res., 2013, 52 (15), pp. 5326-5333.

*Primary Examiner* — Ling Siu Choi
*Assistant Examiner* — Gennadiy Mesh
(74) *Attorney, Agent, or Firm* — TraskBritt

(57) ABSTRACT

A process for producing a flame-retardant polyester includes step (a) and step (b). In step (a), a combination of a bis-hydroxy alkyl terephthalate monomer and an organic diacid monomer mixture which includes an aromatic dicarboxylic acid monomer and a carboxy-phosphinic acid monomer is subjected to an esterification reaction to form an esterification reaction product. In step (b), the esterification reaction product is subjected to a polycondensation reaction.

9 Claims, No Drawings

PROCESS FOR PRODUCING A FLAME-RETARDANT POLYESTER

CROSS-REFERENCE TO RELATED APPLICATION

This application claims priority of Taiwanese Application No. 106134723, filed on Oct. 11, 2017.

FIELD

The disclosure relates to a process for producing a flame-retardant polyester, and more particularly to a process for producing a flame-retardant polyester in which a bis-hydroxy alkyl terephthalate monomer is subjected to an esterification reaction with an organic diacid monomer mixture which includes an aromatic dicarboxylic acid monomer and a carboxy-phosphinic acid monomer. The disclosure also relates to a flame-retardant polyester produced thereby.

BACKGROUND

CN102020766A discloses a method for preparing flame-retardant copolymerized and modified polyester, in which flame retardant such as 2-carboxyethyl phenyl phosphinic acid or hydroxymethyl phenyl phosphinic acid is added to a mixed slurry of terephthalic acid and ethylene glycol such that the flame retardant and ethylene glycol are subjected to an esterification reaction to obtain flame-retardant polyester repeating units, and that the flame-retardant polyester repeating units and ester obtained by esterification of terephthalic acid with ethylene glycol are subjected to a block copolymerization reaction to obtain the flame-retardant copolymerized and modified polyester.

U.S. Pat. No. 5,399,428 discloses a process for producing a flame-retardant linear polyester. In the process, a polyester prepolymer is obtained by, for example, subjecting ethylene glycol and terephthalic acid to a reaction. The polyester prepolymer and a carboxy-phosphinic acid monomer (for example, 2-carboxyethyl phenyl phosphinic acid) are then subjected to a condensation reaction.

CN1563141A discloses a method for producing phosphorus-based flame retardant polyester in which 2-carboxyethyl phenyl phosphinic acid and ethylene glycol are subjected to an esterification reaction to obtain an intermediate, i.e., ethylene glycol propanoyl ethylene glycol phenylphosphate having a formula of

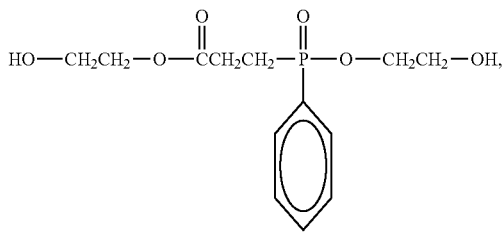

the intermediate is mixed with 2-carboxyethyl phenyl phosphinic acid and ethylene glycol to obtain a flame retardant mixture, and the flame retardant mixture is added to ester obtained by esterification of terephthalic acid with ethylene glycol to perform a polycondensation reaction.

However, the flame-retardant polyesters obtain by the aforesaid prior art have shortcomings such as inferior stability and significant phosphorus loss.

SUMMARY

An object of the disclosure is to provide a process for producing a flame-retardant polyester to overcome the aforesaid shortcomings.

According to an aspect of the disclosure, there is provided a process for producing a flame-retardant polyester, comprising steps of:

(a) subjecting a combination of a bis-hydroxy alkyl terephthalate monomer of Formula (1) and an organic diacid monomer mixture which includes an aromatic dicarboxylic acid monomer and a carboxy-phosphinic acid monomer to an esterification reaction to form an esterification reaction product,

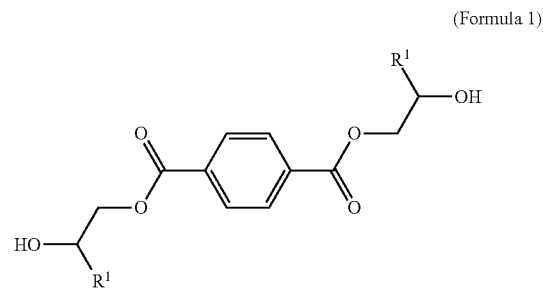

(Formula 1)

wherein each $R^1$ independently represents hydrogen, a $C_1$-$C_6$ linear alkyl group, a $C_3$-$C_6$ branched alkyl group, or phenyl; and (b) subjecting the esterification reaction product to a polycondensation reaction.

According to another aspect of the disclosure, there is provided a flame-retardant polyester produced by the aforesaid process.

DETAILED DESCRIPTION

A process for producing a flame-retardant polyester according to the disclosure comprises steps of:

(a) subjecting a combination of a bis-hydroxy alkyl terephthalate monomer of Formula (1) and an organic diacid monomer mixture which includes an aromatic dicarboxylic acid monomer and a carboxy-phosphinic acid monomer to an esterification reaction to form an esterification reaction product,

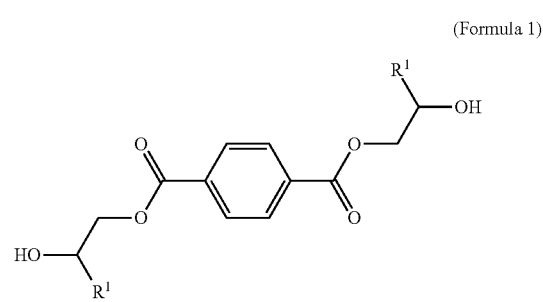

(Formula 1)

wherein each $R^1$ independently represents hydrogen, a $C_1$-$C_6$ linear alkyl group, a $C_3$-$C_6$ branched alkyl group, or phenyl; and (b) subjecting the esterification reaction product to a polycondensation reaction.

A non-limiting example of the bis-hydroxy alkyl terephthalate monomer is bis(2-hydroxyethyl) terephthalate, which may be a commercially available reagent-grade chemical, or which may be obtained by an alcoholysis reaction of polyethylene terephthalate with ethylene glycol or by a reaction of terephthalic acid with ethylene oxide. It should be noted that the bis-hydroxy alkyl terephthalate monomer used in the disclosure is a pure material, rather than a mixture of bis-hydroxy alkyl terephthalate and oligomer thereof. Specifically, bis(2-hydroxyethyl) terephthalate used in the following illustrated examples is pure bis(2-hydroxyethyl) terephthalate, rather than a mixture of bis(2-hydroxyethyl) terephthalate and oligomer thereof obtained via an esterification reaction of terephthalic acid with ethylene glycol or a transesterification reaction of polyethylene terephthalate with ethylene glycol.

The carboxy-phosphinic acid monomer is a flame retardant. In certain embodiments, the carboxy-phosphinic acid monomer is selected from the group consisting of 2-carboxyethyl phenyl phosphinic acid, 2-carboxyethyl methyl phosphinic acid, cyclic anhydride of 2-carboxyethyl phenyl phosphinic acid, cyclic anhydride of 2-carboxyethyl methyl phosphinic acid, and combinations thereof. The carboxy-phosphinic acid monomer used in following illustrated examples is 2-carboxyethyl phenyl phosphinic acid.

There is no specific limitation to the amount of the carboxy-phosphinic acid monomer used in the process for producing a flame-retardant polyester of the disclosure. In certain embodiments, a molar ratio of the bis-hydroxy alkyl terephthalate monomer to the carboxy-phosphinic acid monomer used in the process for producing a flame-retardant polyester of the disclosure ranges from 4.1:1 to 100:1. When the molar ratio of the bis-hydroxy alkyl terephthalate monomer to the carboxy-phosphinic acid monomer is within the aforesaid range, the flame-retardant polyester thus produced has a superior flame retardant effect. In certain embodiments, the molar ratio of the bis-hydroxy alkyl terephthalate monomer to the carboxy-phosphinic acid monomer ranges from 5:1 to 100:1.

In certain embodiments, the aromatic dicarboxylic acid monomer suitable for the process of the disclosure is selected from the group consisting of terephthalic acid, isophthalic acid, phthalic acid, diphenic acid, 2,6-naphthalic acid, 1,5-naphthalic acid, and combinations thereof. The aromatic dicarboxylic acid monomer used in the following illustrated examples is terephthalic acid.

There is no specific limitation to a molar ratio of the bis-hydroxy alkyl terephthalate monomer to the aromatic dicarboxylic acid monomer used in the process of the disclosure. In certain embodiments, the molar ratio of the bis-hydroxy alkyl terephthalate monomer to the aromatic dicarboxylic acid monomer ranges from 1.3:1 to 100:1. When the molar ratio of the bis-hydroxy alkyl terephthalate monomer to the aromatic dicarboxylic acid monomer is within the aforesaid range, the flame-retardant polyester may be produced favorably.

There is no specific limitation to the temperature for the esterification reaction in step (a) as long as the esterification reaction may be performed. In certain embodiments, the esterification reaction in step (a) is performed at a temperature ranging from 190° C. to 260° C.

There is also no specific limitation to the pressure for the esterification reaction in step (a) as long as the esterification reaction may be performed. It should be noted that in the process of the disclosure, since the bis-hydroxy alkyl terephthalate monomer of Formula (1) is used in combination with the organic diacid monomer mixture, the esterification reaction may be performed at a normal pressure.

There is also no specific limitation to the reaction conditions for the polycondensation reaction in step (b) as long as the esterification reaction product may be subjected to the polycondensation reaction. In certain embodiments, the polycondensation reaction in step (b) is performed in the presence of a catalyst so as to enhance the polycondensation reaction. In certain embodiments, the catalyst for the polycondensation reaction is a transition metal-containing polycondensation catalyst. Examples of the transition metal-containing polycondensation catalyst include, but are not limited to, antimony-containing compounds, tin-containing compounds, titanium-containing compounds, gallium-containing compounds, aluminum-containing compounds, and combinations thereof. The aforesaid examples of the transition metal-containing polycondensation catalyst may be used alone or in admixture of two or more thereof. In certain embodiments, the transition metal-containing polycondensation catalyst is selected from the group consisting of antimony (III) oxide ($Sb_2O_3$), antimony acetate, antimony glycolate, titanium isopropoxide, titanium butoxide, dibutyltin oxide, n-butyl hydroxytin oxide, and combinations thereof.

There is no specific limitation to the amount of the transition metal-containing polycondensation catalyst. For example, the amount of the transition metal-containing polycondensation catalyst may be adjusted depending on the extent of the polycondensation reaction intended to be carried out. When the catalyst is used in the polycondensation reaction, the catalyst may be added, for example, at a time when an esterification rate of the esterification reaction is above 80%.

There is no specific limitation to the temperature and the pressure for the polycondensation reaction as long as the polycondensation reaction may be performed. In certain embodiments, the polycondensation reaction in step (b) is performed at a temperature ranging from 270° C. to 285° C.

In certain embodiments, the polycondensation reaction may be performed in the presence of a polycondensation stabilizer. A non-limiting example of the polycondensation stabilizer is phosphoric acid.

Examples of the disclosure will be described hereinafter. It is to be understood that these examples are exemplary and explanatory and should not be construed as a limitation to the disclosure.

Example 1

Into a reactor (1 L) were charged bis(2-hydroxyethyl) terephthalate (280.6 g, 1.1 mole, powdery, supplied by Sigma-Aldrich), terephthalic acid (84 g, 0.5 mole), and 2-carboxyethyl phenyl phosphinic acid (36.2 g, 0.17 mole, phosphorous content: 14.47 wt %) to obtain a combination. Nitrogen gas was purged into the reactor until the pressure in the reactor reached 0.5-1 kg/cm$^2$ so as to displace air from the reactor. The combination was subjected to an esterification reaction under a nitrogen atmosphere at a normal pressure and at a temperature of 250° C. until an esterification rate of 84% was achieved to thereby obtain an esterification reaction product in the reactor. Antimony (III) oxide (0.105 g) and a solution phosphoric acid in ethylene glycol (0.525 g, a concentration of phosphoric acid: 5 wt %) were then added into the reactor, followed by a polycondensation reaction of the esterification reaction product at a temperature of 275° C. until the viscosity of a reaction mixture thus formed was above 0.6 to thereby obtain a flame-resistant polyester. A phosphorus content and an antimony content of the flame-resistant polyester were determined to be 1.5 wt % and 300 ppm, respectively, based on a total weight of the flame-resistant polyester.

Comparative Example 1

Into a reactor (1 L) were charged ethylene glycol (137 g, 2.2 mole), terephthalic acid (267.6 g, 1.61 mole), and 2-carboxyethyl phenyl phosphinic acid (36.2 g, 0.17 mole, phosphorous content: 14.47 wt %) to obtain a combination. The combination was subjected to an esterification reaction under a nitrogen atmosphere at a pressure of 2 kg/cm$^2$ and at a temperature of 260° C. until an esterification rate of 86% was achieved to thereby obtain an esterification reaction product in the reactor. Antimony (III) oxide (0.105 g) and a solution phosphoric acid in ethylene glycol (0.525 g, a concentration of phosphoric acid: 5 wt %) were then added into the reactor, followed by a polycondensation reaction of the esterification reaction product at a temperature of 275° C. until the viscosity of a reaction mixture thus formed was above 0.6 to thereby obtain a flame-resistant polyester. A phosphorus content and an antimony content of the flame-resistant polyester were determined to be 1.5 wt % and 300 ppm, respectively, based on a total weight of the flame-resistant polyester.

Comparative Example 2

Into a reactor (1 L) were charged ethylene glycol (126.7 g, 2.04 mole) and terephthalic acid (271.5 g, 1.63 mole) to obtain a first mixture. The first mixture was subjected to an esterification reaction under a nitrogen atmosphere at a pressure of 2 kg/cm$^2$ and at a temperature of 260° C. until an esterification rate of the esterification reaction was 86%. A flame retardant (82.04 g, containing 57.8 wt % of ethylene glycol) obtained via an esterification reaction of 2-carboxyethyl phenyl phosphinic acid (phosphorous content: 14.47 wt %) with ethylene glycol was then added into the reactor to obtain a second mixture. The second mixture was subjected to the esterification reaction further at a normal pressure and at a temperature of 250° C. until the esterification rate of the esterification reaction was 85% to thereby obtain an esterification reaction product. Antimony (III) oxide (0.105 g) and a solution phosphoric acid in ethylene glycol (0.525 g, a concentration of phosphoric acid: 5 wt %) were then added into the reactor to obtain a third mixture. The third mixture was subjected to a polycondensation reaction at a temperature of 275° C. until the viscosity of a reaction mixture thus formed was above 0.6 to thereby obtain a flame-resistant polyester. A phosphorus content and an antimony content of the flame-resistant polyester were determined to be 1.5 wt % and 300 ppm, respectively, based on a total weight of the flame-resistant polyester.

Comparative Example 3

Into a reactor (1 L) were charged ethylene glycol (126.7 g, 2.04 mole) and terephthalic acid (271.5 g, 1.63 mole) to obtain a first mixture. The first mixture was subjected to an esterification reaction under a nitrogen atmosphere at a pressure of 2 kg/cm$^2$ and at a temperature of 260° C. until an esterification rate of the esterification reaction was 86%. A flame retardant (82.04 g, containing 57.8 wt % of ethylene glycol) obtained via an esterification reaction of 2-carboxyethyl phenyl phosphinic acid (phosphorous content: 14.47 wt %) with ethylene glycol was then added into the reactor to obtain a second mixture. The second mixture was subjected to the esterification reaction further at a normal pressure and at a temperature of 250° C. until the esterification rate of the esterification reaction was 85% to thereby obtain an esterification reaction product. Antimony (III) oxide (0.105 g) and a solution phosphoric acid in ethylene glycol (0.525 g, a concentration of phosphoric acid: 5 wt %) were then added into the reactor to obtain a third mixture. The third mixture was subjected to a polycondensation reaction at a temperature of 275° C. until the viscosity of a reaction mixture thus formed was above 0.6 to thereby obtain a flame-resistant polyester. A phosphorus content and an antimony content of the flame-resistant polyester were determined to be 1.5 wt % and 300 ppm, respectively, based on a total weight of the flame-resistant polyester.

Property Evaluation:

1. Practical Phosphorus Content and Phosphorus Loss:

A practical phosphorus content (in ppm) in the flame-resistant polyester obtained in each of Example 1 and Comparative Examples 1-3 was measured using an X-ray fluorescence spectrometer (Oxford LAD-X300). Phosphorus loss was calculated by subtracting the practical phosphorus content from a theoretical phosphorus addition amount. The theoretical phosphorus addition amount was calculated by dividing a weight of phosphorus contained in 2-carboxyethyl phenyl phosphinic acid by a total weight of the flame-resistant polyester. It should be noted that the lower the phosphorus loss, the more the phosphorus content in the flame-resistant polyester and the better the flame retardance.

2. Intrinsic Viscosity:

The flame-resistant polyester obtained in each of Example 1 and Comparative Examples 1-3 was added into a mixture of phenol and tetrachloroethane in a weight ratio of 3:2 to prepare a test solution having a concentration of 0.4 wt/vol %. The test solution was then measured at a temperature of 30±0.02° C. using an Ubbelihde viscometer to obtain the intrinsic viscosity thereof.

3. Content of Diethylene Glycol:

A content of diethylene glycol (in %) contained in the flame-resistant polyester obtained in each of Example 1 and Comparative Examples 1-3 was measured using a gas chromatography (Perkin Elmer Autosystem XL) according to a process as follows. The flame-resistant polyester was added into 1,4-butylene glycol, followed by addition of a solution of potassium hydroxide in n-propanol to dissolve the flame-resistant polyester and then addition of a proper amount of hydrogen chloride (1.6 N) with stirring to obtain a mixture. A supernatant obtained from the mixture was injected into the gas chromatography to determine a concentration of diethylene glycol.

4. Randomness:

Randomness is defined by a formula of:

$$(A/2)/[(A/2)+B]+(A/2)/[(A/2)+C+D]$$

wherein
A indicates the number of segments CEPPA-GE-PTA;
B indicates the number of segments CEPPA-EG-CEPPA;
C indicates the number of segments PTA-EG-PTA; and
D indicates the number of terminal segments,
wherein
CEPPA indicates a 2-carboxyethyl phenyl phosphinic acid monomeric unit;
EG indicates an ethylene glycol monomeric unit; and
PTA indicates a terephthalic acid monomeric unit.

The numbers of segments CEPPA-GE-PTA, CEPPA-EG-CEPPA, PTA-EG-PTA, and the terminal segment may be measured according to the method described in *Ind. Eng. Chem. Res.*, 2013, 52 (15), pp 5326-5333 by respectively integrating surface areas of characteristic peaks corresponding to these segments. It should be noted that the higher the randomness, the more even the distribution of the 2-carboxyethyl phenyl phosphinic acid monomeric units in the chain of the flame-retardant polyester.

5. Decomposition Temperature:

The flame-resistant polyester obtained in each of Example 1 and Comparative Examples 1-3 was heated from 30° C. to 600° C. at a heating rate of 10° C./min under an oxygen atmosphere using a thermogravimetric analyzer (TA Instruments TGA 2950). The temperature at which there is a 5% weight loss in the flame-resistant polyester was measured and recorded as the decomposition temperature. It should be noted that the higher the decomposition temperature, the better the thermal stability of the flame-resistant polyester.

6. Storage Stability:

The acid value of the flame-resistant polyester obtained in each of Example 1 and Comparative Examples 1-3 was measured according to a process described below. Then the flame-resistant polyester was allowed to stand at a temperature of 130° C. for 48 hours to simulate hydrolysis of the flame-resistant polyester during a storage period. After 48 hours, the acid value of the flame-resistant polyester was measured again so as to calculate an increasing ratio (in %) of the acid value of the flame-resistant polyester. It should be noted that the larger the increasing ratio, the larger the hydrolysis degree and the worse the storage stability.

The acid value of the flame-resistant polyester was measured as follows.

The flame-resistant polyester (2-4 g) was added into a mixture of phenol and tetrachloroethane in a weight ratio of 3:2 (50 ml), followed by heating until the flame-resistant polyester was fully dissolved to thereby obtain a test solution. Six to eight drops of a bromophenol blue indicator was added into the test solution, which was then titrated with a potassium hydroxide-benzyl alcohol solution (0.1 N). The color of the test solution initially turned from yellow to yellowish green. The titration was terminated when the color of the test solution turned to blue. The acid value was calculated from the titration results according to a formula as follows:

$$\text{Acid value (meq KOH/kg)} = (V1-V0) \times 0.1N \times 1000/W1$$

wherein

V1 indicates a titration amount (in ml) for the test solution;

V0 indicates a titration amount (in ml) for a blank solution (ml); and

W1 indicates a weight (in g) of the flame-retardant polyester.

The acid value increasing ratio was calculated according to a formula as follows.

$$\text{Acid value increasing ratio} = 100\% \times ([COOH]_2 - [COOH]_1)/[COOH]_1$$

wherein $[COOH]_1$ indicates an initial acid value of the flame-retardant polyester, and $[COOH]_2$ indicates an acid value of the flame-retardant polyester after 48 hours.

The evaluation results are shown in Table 1 below.

TABLE 1

|  |  | Ex. 1 | Comp. Ex. 1 | Comp. Ex. 2 | Comp. Ex. 3 |
|---|---|---|---|---|---|
| Phosphorus loss (ppm) | | 150 | 880 | 624 | 1930 |
| Intrinsic Viscosity | | 0.705 | 0.646 | 0.607 | 0.600 |
| Content of diethylene glycol (%) | | 1.30 | 6.69 | 5.21 | 4.88 |
| Randomness | | 0.77 | 0.70 | 0.72 | 0.67 |
| Decomposition temperature (° C.) | | 380 | 352 | 353 | 353 |
| Storage stability | $[COOH]_1$ (meq KOH/kg) | 61.2 | 53.7 | 61.3 | 48.4 |
| | $[COOH]_2$ (meq KOH/kg) | 85.6 | 90.0 | 97.7 | 79.6 |
| | Acid value increasing rate (Hydrolysis degree) (%) | 39 | 67 | 59 | 64 |

As shown in Table 1, the flame-retardant polyester obtained in Example 1 has a randomness of 0.77, indicating that the 2-carboxyethyl phenyl phosphinic acid monomeric unit (i.e., flame-retardant modifier) is more evenly distributed in the chain of the flame-retardant polyester. As such, the flame-retardant polyester obtained in Example 1 has: an acid value increasing ratio of only 39%, indicating that the flame-retardant polyester has superior storage stability; a decomposition temperature of 380° C., indicating that the flame-retardant polyester has superior thermal stability; and a phosphorus loss of only 150 ppm, indicating that flame-retardant polyester contains a greater amount of phosphorus and thus has superior flame retardance. The flame-retardant polyesters obtained in Comparative Examples 1-3 have a randomness from 0.67 to 0.72, which is lower than that obtained in Example 1 and which indicates that the 2-carboxyethyl phenyl phosphinic acid monomeric unit (i.e., flame-retardant modifier) is relatively unevenly distributed in the chain of each of the flame-retardant polyesters. As such, the flame-retardant polyesters obtained in Comparative Examples 1-3 have: a relatively high acid value increasing ratio from 59% to 67%, indicating that the flame-retardant polyesters have relatively inferior storage stability; a relatively low decomposition temperature from 352° C. to 353° C., indicating that the flame-retardant polyesters have relatively inferior thermal stability; and a relatively high phosphorus loss from 624 ppm to 1930 ppm, indicating that the flame-retardant polyesters contain smaller amounts of phosphorus and thus have relatively inferior flame retardance.

Notably, it is shown from the results of the decomposition temperatures of the flame-retardant polyesters obtained in Example 1 and Comparative Examples 1 to 3 that the flame-retardant polyester obtained in Example 1 has more even distribution of the 2-carboxyethyl phenyl phosphinic acid monomeric unit (i.e., flame-retardant modifier) in the chain of the flame-retardant polyester and less phosphorus loss, and thus has superior thermal stability.

In view of the aforesaid, in the process for producing a flame-retardant polyester according to the disclosure, the bishydroxy alkyl terephthalate monomer of Formula (1) and the organic diacid monomer mixture which includes the aromatic dicarboxylic acid monomer and the carboxy-phosphinic acid monomer are subjected to an esterification reaction to form an esterification reaction product, and the esterification reaction product is subjected to a polycondensation reaction such that the 2-carboxyethyl phenyl phosphinic acid monomeric unit (i.e., flame-retardant modifier) is more evenly distributed in the chain of the flame-retardant polyester. As such, the flame-retardant polyester obtained thereby has superior thermal stability, better storage stability, and less phosphorus loss.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A process for producing a flame-retardant polyester, comprising steps of:
   (a) subjecting a bis-hydroxy alkyl terephthalate monomer of Formula (1) to an esterification reaction with an organic diacid monomer mixture which includes an aromatic dicarboxylic acid monomer and a carboxy-phosphinic acid monomer to form an esterification reaction product, (Formula 1)

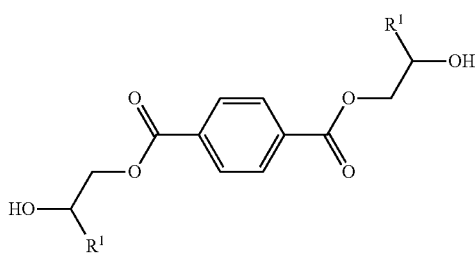

wherein each $R^1$ independently represents hydrogen, a $C_1$-$C_6$ linear alkyl group, a $C_3$-$C_6$ branched alkyl group, or phenyl; and
   (b) subjecting the esterification reaction product to a polycondensation reaction.

2. The process according to claim 1, wherein each $R^1$ is hydrogen.

3. The process according to claim 1, wherein the carboxy-phosphinic acid monomer is selected from the group consisting of 2-carboxyethyl phenyl phosphinic acid, 2-carboxyethyl methyl phosphinic acid, cyclic anhydride of 2-carboxyethyl phenyl phosphinic acid, cyclic anhydride of 2-carboxyethyl methyl phosphinic acid, and combinations thereof.

4. The process according to claim 1, wherein in step a), a molar ratio of the bis-hydroxy alkyl terephthalate monomer to the aromatic dicarboxylic acid monomer ranges from 1.3:1 to 100:1.

5. The process according to claim 1, wherein in step a), a molar ratio of the bis-hydroxy alkyl terephthalate monomer to the carboxy-phosphinic acid monomer ranges from 4.1:1 to 100:1.

6. The process according to claim 1, wherein the aromatic dicarboxylic acid monomer is selected from the group consisting of terephthalic acid, isophthalic acid, phthalic acid, diphenic acid, 2,6-naphthalic acid, 1,5-naphthalic acid, and combinations thereof.

7. The process according to claim 1, wherein the esterification reaction in step (a) is performed at a normal pressure.

8. The process according to claim 1, wherein the polycondensation reaction in step (b) is performed in the presence of a catalyst.

9. The process according to claim 8, wherein the catalyst is a transition metal-containing polycondensation catalyst.

* * * * *

UNITED STATES PATENT AND TRADEMARK OFFICE
CERTIFICATE OF CORRECTION

PATENT NO. : 10,662,326 B2
APPLICATION NO. : 15/904065
DATED : May 26, 2020
INVENTOR(S) : Der-Ren Hwang, Cheng-Ting Wang and Yen-Hsien Li Page 1 of 1

It is certified that error appears in the above-identified patent and that said Letters Patent is hereby corrected as shown below:

On the Title Page
In ITEM (73) Assignee: change "Far Easter New" to --Far Eastern New--

Signed and Sealed this
Eighteenth Day of August, 2020

Andrei Iancu
*Director of the United States Patent and Trademark Office*